(12) United States Patent
Feinberg et al.

(10) Patent No.: US 12,488,024 B1
(45) Date of Patent: Dec. 2, 2025

(54) SYSTEM AND METHOD FOR ARTIFICIAL INTELLIGENCE INPUT OPTIMIZATION AND CONTROL

(71) Applicant: Verax AI Trust LTD, Ramat Gan (IL)

(72) Inventors: Leonid Feinberg, London (GB); Oren Gev, Plano, TX (US); Ishai Rosenberg, Modiin (IL)

(73) Assignee: Verax AI Trust LTD, Ramat Gan (IL)

( * ) Notice: Subject to any disclaimer, the term of this patent is extended or adjusted under 35 U.S.C. 154(b) by 0 days.

(21) Appl. No.: 18/986,122

(22) Filed: Dec. 18, 2024

(51) Int. Cl.
*G06F 16/00* (2019.01)
*G06F 16/2455* (2019.01)
*G06F 16/28* (2019.01)

(52) U.S. Cl.
CPC ...... *G06F 16/285* (2019.01); *G06F 16/24565* (2019.01)

(58) Field of Classification Search
CPC .................. G06F 16/285; G06F 16/24565
USPC .............................................. 707/738
See application file for complete search history.

(56) References Cited

U.S. PATENT DOCUMENTS

| | | | |
|---|---|---|---|
| 11,720,600 B1 * | 8/2023 | Dixit .................. | G06N 20/00 707/738 |
| 11,838,787 B2 | 12/2023 | Lo et al. | |
| 11,915,179 B2 | 2/2024 | Lee et al. | |
| 12,182,539 B1 * | 12/2024 | Myers .................. | G06F 8/77 707/707 |
| 12,204,323 B1 * | 1/2025 | Malviya ............. | G05B 23/0216 707/707 |
| 12,210,858 B1 * | 1/2025 | Silver .................. | G06F 8/77 707/707 |
| 12,210,949 B1 * | 1/2025 | Silver .................. | G06N 20/20 707/707 |
| 12,254,005 B1 * | 3/2025 | Sinha .................. | G06F 16/243 707/707 |
| 12,271,720 B1 * | 4/2025 | Silver .................. | G06N 5/025 707/707 |
| 12,299,140 B2 * | 5/2025 | Rahman ............. | G06F 21/577 707/707 |
| 12,314,294 B1 * | 5/2025 | Browder ............. | G06F 16/31 707/707 |
| 12,332,896 B1 * | 6/2025 | Xu ...................... | G06F 16/24549 707/707 |
| 2025/0054068 A1 * | 2/2025 | Arriaga .............. | G06N 3/045 707/707 |
| 2025/0103601 A1 * | 3/2025 | Zhao .................. | G06F 16/24578 707/707 |
| 2025/0217673 A1 * | 7/2025 | Silver .................. | G06F 8/427 707/707 |

* cited by examiner

*Primary Examiner* — Alexandria Y Bromell
(74) *Attorney, Agent, or Firm* — M&B IP Analysts, LLC

(57) ABSTRACT

A system and method for applying controls on an input for an artificial intelligence model is presented. The method includes receiving an input for a system having an artificial intelligence (AI) model, wherein the generative AI model is configured to generate an output based on at least a data source; determining at least a constraint for the input based on a predetermined constraint; generating a modified input based on the determined constraint; and processing the modified input utilizing the generative artificial AI model to generate an output; and sending the generated output to a client of the system.

28 Claims, 7 Drawing Sheets

SYSTEM AND METHOD FOR ARTIFICIAL INTELLIGENCE INPUT OPTIMIZATION AND CONTROL

TECHNICAL FIELD

The present disclosure relates generally to artificial intelligence, and specifically to applying controls on inputs and outputs of a system utilizing an artificial intelligence.

BACKGROUND

Data Loss Prevention (DLP) in AI involves techniques to protect sensitive data from unauthorized access, leakage, or misuse. DLP focuses on identifying and monitoring data to prevent exposure of confidential information, especially when AI systems process large volumes of personal or proprietary data. A problem in this area is detecting unintentional data exposure when sensitive data is embedded within vast datasets that AI models analyze. For instance, training data might contain hidden personal identifiers that are inadvertently learned and reproduced by a model, creating a risk of unintentional data leakage.

Data Sanitization in AI refers to cleaning and preparing data to remove sensitive information, noise, or inconsistencies, ensuring that datasets used for training are safe and appropriate. It's especially crucial in AI to prevent biases, privacy issues, and inappropriate content. A significant challenge in data sanitization is distinguishing sensitive information without over-sanitizing, which can compromise data utility. For example, in natural language processing, removing names or context-sensitive phrases could strip essential information, reducing model effectiveness, yet retaining them may pose privacy risks. The delicate balance between preserving data integrity and ensuring privacy remains a core issue in data sanitization for AI applications.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, method may include receiving an input for a system having an artificial intelligence (AI) model, where the generative AI model is configured to generate an output based on at least a data source. The method may also include determining at least a constraint for the input based on a predetermined constraint. The method may furthermore include generating a modified input based on the determined constraint. The method may in addition include processing the modified input utilizing the generative artificial AI model to generate an output. The method may moreover include sending the generated output to a client of the system. Other embodiments of this aspect include corresponding computer systems, apparatus, and computer programs recorded on one or more computer storage devices, each configured to perform the actions of the methods.

Implementations may include one or more of the following features. The method may include: generating the predetermined constraint based on an analysis of a plurality of input-output pairs, each input-output pair including an output generated by the generative AI based on an input. The method may include: clustering the plurality of input-output pairs into a plurality of input-output groups, where each input-output group is clustered based on the input. The method may include: clustering the plurality of input-output pairs into a plurality of input-output groups, where each input-output group is clustered based on the output. The method where the analysis of the plurality of input-output pairs further may include: generating a verification score for each output of an input-output pair; and generating the predetermined constraint based on input-output pairs having a verification score which satisfies condition based on a predetermined threshold. The method may include: detecting at least an attribute common to each input of the input-output pairs having the verification score which satisfies the condition; and generating the modified input further based on the detected attribute. The method may include: detecting at least another attribute common to each input of the input-output pairs having a verification score which does not satisfy the condition; and generating the modified input further based on the detected at least another attribute. The method may include: generating the predetermined constraint based on an analysis of a plurality of inputs. The method may include: generating the predetermined constraint based on an analysis of a plurality of outputs. The method may include: generating a first contextual value based on the optimized input; generating a second contractual value based on the generated output; and generating a verification score based on any one of: the first contextual value, the second contextual value, and a combination thereof. The method may include: sending the generated output in response to determining that the verification score satisfies a condition based on a predetermined threshold. The method may include: initiating generation of a second modified input, in response to determining that the verification score does not satisfy a condition; processing the second modified input to generate another output; and sending the another output in response to determining that a verification score based on the another output satisfies the condition. The method may include: generating the second modified input based on a second determined constraint. The method may include: generating a metadata based on the verification score; and sending the generated output and the generated metadata. The method may include: generating the verification score further based on data extracted from the at least a data source. The method where sending the output further may include: modifying the output based on any one of: sanitizing the output, generating a semantically compressed output, modifying a tone of the output, and any combination thereof. Implementations of the described techniques may include hardware, a method or process, or a computer tangible medium.

In one general aspect, non-transitory computer-readable medium may include one or more instructions that, when executed by one or more processors of a device, cause the device to: receive an input for a system having an artificial intelligence (AI) model, where the generative AI model is configured to generate an output based on at least a data source; determine at least a constraint for the input based on a predetermined constraint; generate a modified input based on the determined constraint; and process the modified input utilizing the generative artificial AI model to generate an output; and send the generated output to a client of the system. Other embodiments of this aspect include corresponding computer systems, apparatus, and computer programs recorded on one or more computer storage devices, each configured to perform the actions of the methods.

In one general aspect, system may include one or more processors configured to: receive an input for a system having an artificial intelligence (AI) model, where the generative AI model is configured to generate an output based on at least a data source. The system may furthermore determine at least a constraint for the input based on a predetermined constraint. The system may in addition generate a modified input based on the determined constraint. The system may moreover process the modified input utilizing the generative artificial AI model to generate an output. The system may also send the generated output to a client of the system. Other embodiments of this aspect include corresponding computer systems, apparatus, and computer programs recorded on one or more computer storage devices, each configured to perform the actions of the methods.

Implementations may include one or more of the following features. The system where the one or more processors are further configured to: generate the predetermined constraint based on an analysis of a plurality of input-output pairs, each input-output pair including an output generated by the generative AI based on an input. The system where the one or more processors are further configured to: cluster the plurality of input-output pairs into a plurality of input-output groups, where each input-output group is clustered based on the input. The system where the one or more processors are further configured to: cluster the plurality of input-output pairs into a plurality of input-output groups, where each input-output group is clustered based on the output. The system where the analysis of the plurality of input-output pairs further may include: generating a verification score for each output of an input-output pair; and generating the predetermined constraint based on input-output pairs having a verification score which satisfies condition based on a predetermined threshold. The system where the one or more processors are further configured to: detect at least an attribute common to each input of the input-output pairs having the verification score which satisfies the condition; and generate the modified input further based on the detected attribute. The system where the one or more processors are further configured to: detect at least another attribute common to each input of the input-output pairs having a verification score which does not satisfy the condition; and generate the modified input further based on the detected at least another attribute. The system where the one or more processors are further configured to: generate the predetermined constraint based on an analysis of a plurality of inputs. The system where the one or more processors are further configured to: generate the predetermined constraint based on an analysis of a plurality of outputs. The system where the one or more processors are further configured to: generate a first contextual value based on the optimized input; generate a second contractual value based on the generated output; and generate a verification score based on any one of: the first contextual value, the second contextual value, and a combination thereof. The system where the one or more processors are further configured to: send the generated output in response to determining that the verification score satisfies a condition based on a predetermined threshold. The system where the one or more processors are further configured to: initiate generation of a second modified input, in response to determining that the verification score does not satisfy a condition; process the second modified input to generate another output; and send the another output in response to determining that a verification score based on the another output satisfies the condition. The system where the one or more processors are further configured to: generate the second modified input based on a second determined constraint. The system where the one or more processors are further configured to: generate a metadata based on the verification score; and send the generated output and the generated metadata. The system where the one or more processors are further configured to: generate the verification score further based on data extracted from the at least a data source. The system where the one or more processors, when sending the output, are configured to: modify the output based on any one of: sanitize the output, generating a semantically compressed output, modifying a tone of the output, and any combination thereof. Implementations of the described techniques may include hardware, a method or process, or a computer tangible medium.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
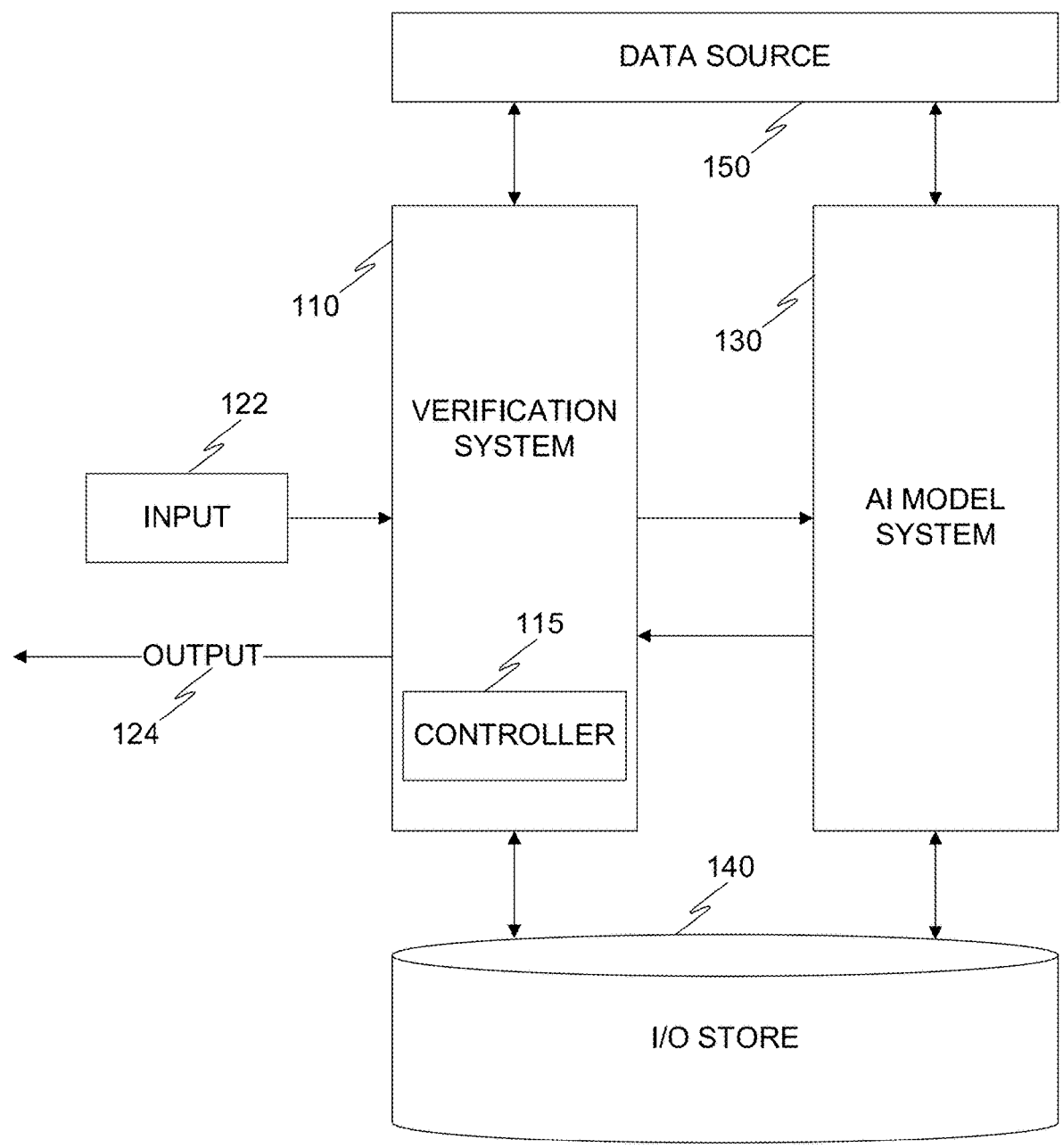
FIG. 1 is an example schematic illustration of an artificial intelligence (AI) system utilizing a verification system, implemented in accordance with an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

FIG. 1 is an example schematic illustration of an artificial intelligence (AI) system utilizing a verification system, implemented in accordance with an embodiment. According to an embodiment, a verification system 110 includes a controller 115. In some embodiments, the controller 115 is a guardrail, an input control, an output control, a combination thereof, and the like.

In an embodiment, the verification system 110 is configured to receive an input 122. In some embodiments, the input 122 is an input for an AI model system 130. According to an embodiment, the AI model system 130 includes a generative AI model, a generative adversarial network (GAN), an artificial neural network (ANN), various combinations thereof, and the like.

In certain embodiments the AI model system 130 is configured to receive an input and generate therefrom an output. In an embodiment, the AI model system 130 includes a deterministic model, a non-deterministic model, a combination thereof, and the like. In some embodiments, the AI model system 130 is configured to generate an output based at least on data from a data source 150.

In an embodiment, the data source 150 is a knowledgebase, which includes unstructured data, structured data, a combination thereof, and the like. For example, in an embodiment, a knowledgebase is implemented as a Confluence® page, a Slack® channel, a Wiki™ platform, and the like.

In some embodiments, a data source 150 includes a database, a ticket issue system, a structured data source, and the like. For example, in an embodiment, a data source 150 includes a data schema, which specifies how data in the data source 150 is stored, accessed, etc.

In certain embodiments, a data source 150 is utilized by an AI model system 130 for example in retrieval augmented generation (RAG). In an embodiment, the AI model system 130 includes a unimodal system, a multimodal system, a combination thereof, and the like. In certain embodiments, the AI model system 130 includes a language model, such as a large language model (LLM). In an embodiment, an LLM is GPT, LaMDA, LLaMa, BERT, and the like.

In an embodiment, the AI model system 130 is implemented on a virtualized computing environment, such as a virtual machine, a software container platform, a serverless function, a combination thereof, and the like. In some embodiments, the virtualized computing environment is deployed on a physical resource including, for example, an AI accelerator processing circuitry. In an embodiment, such a processing circuitry is implemented as a GPU, a GPGPU, a TPU, an FPGA, an ASIC, a combination thereof, and the like.

According to an embodiment, the AI model system 130 is configured to store input/output pairs in an I/O store 140. In an embodiment, the I/O store 140 is a cloud storage, utilizing, for example, a bucket. In certain embodiments, an I/O pair includes an indicator indicating whether an input was modified, an output was modified, a combination thereof, and the like. In an embodiment, an I/O pair includes any one of: an input, a modified input, an output, a modified output, and any combination thereof.

In some embodiments, the controller 115 of the verification system 110 is configured to apply a control on an input 122, on a result of an AI model of the AI model system 130, a combination thereof, and the like. For example, according to an embodiment, the verification system 110 is configured to detect outlying inputs, outlying outputs, etc.

In an embodiment, the controller 115 is configured to generate a constraint, for example, based on a group of I/O pairs. In an embodiment, the controller 115 is configured to access the I/O store 140 and detect clusters of I/O pairs. In some embodiments, I/O pairs are clustered based on an input, based on an output, based on a verification score, based on a semantic similarity of the input, based on a semantic similarity of the output, a combination thereof, and the like.

In an embodiment, the verification system 110 is configured to apply a control on a result generated by the AI model system 130 based on the input 122, and provide an output 124. In some embodiments, the output 124 is only provided by the verification system 110 in response to determining that a verification score generated based at least on the output 124 satisfies a condition. In an embodiment, satisfying a condition includes exceeding a threshold, being below a threshold, etc.

Figure 2:
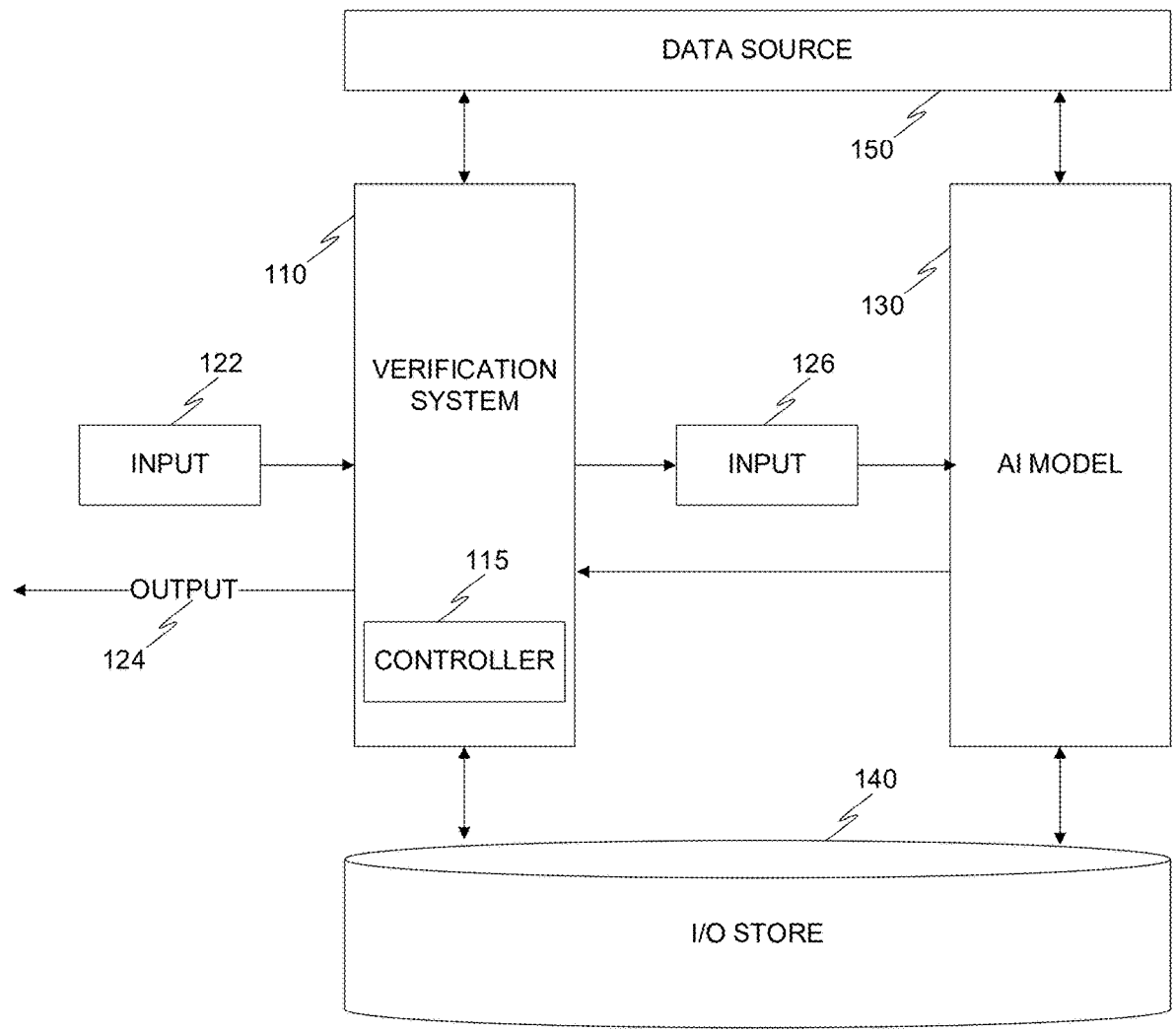
FIG. 2 is an example schematic illustration of an artificial intelligence (AI) system utilizing a verification system, implemented in accordance with another embodiment.

FIG. 2 is an example schematic illustration of an artificial intelligence (AI) system utilizing a verification system, implemented in accordance with another embodiment. According to certain embodiments, the verification system 110 is configured to receive an input 122 for an AI model system 130 and generate therefrom a modified input 126.

In some embodiments, generating a modified input 126 is performed utilizing a language model, such as a large language model (LLM). In an embodiment, generating a modified input 126 is performed by generating a prompt, which when executed by a generative AI, such as an LLM, configures the generative AI to output the modified input 126. In an embodiment, the prompt is generated based on the input 122, an input from the I/O store 140, an output from the I/O store 140, an attribute of an input, an attribute of an output, a feature of an input, a feature of a group of inputs, a feature of an output, a feature of a group of outputs, a combination thereof, and the like. In certain embodiments, a modified input 126 is generated utilizing a language model, a regular expression (regex), a natural language processing (NLP) model, a machine learning (ML) model, a word substitution mapping, a phrase substitution mapping, a combination thereof, and the like. In an embodiment, a modified input 126 is generated further utilizing a knowledge graph, a similar input as determined by performing a vector match between the input 122 and another input, a semantic match between the input 122 and another input, a combination thereof, and the like.

For example, in an embodiment, a controller 115 is configured to detect a data pattern based on a plurality of inputs, a data pattern based on a plurality of outputs, a data pattern based on a combination of inputs and outputs, a combination thereof, and the like. In an embodiment, the data pattern is based on an attribute, a feature, and the like. In some embodiments, the data pattern is generated based on a cluster of I/O pairs generated based on inputs, a cluster of I/O pairs generated based on outputs, and the like.

In an embodiment, the controller 115 is configured to generate a constraint, plurality of constraints, etc., which are utilized in generating the modified input 126. For example, in an embodiment, a generative AI model is configured to select a preexisting constraint from a plurality of preexisting constraints generated by the controller 115. In certain embodiments, a prompt is generated for a generative AI model of the AI model system 130 utilizing a constraint, an input, an output, and any combination thereof.

Figure 3:
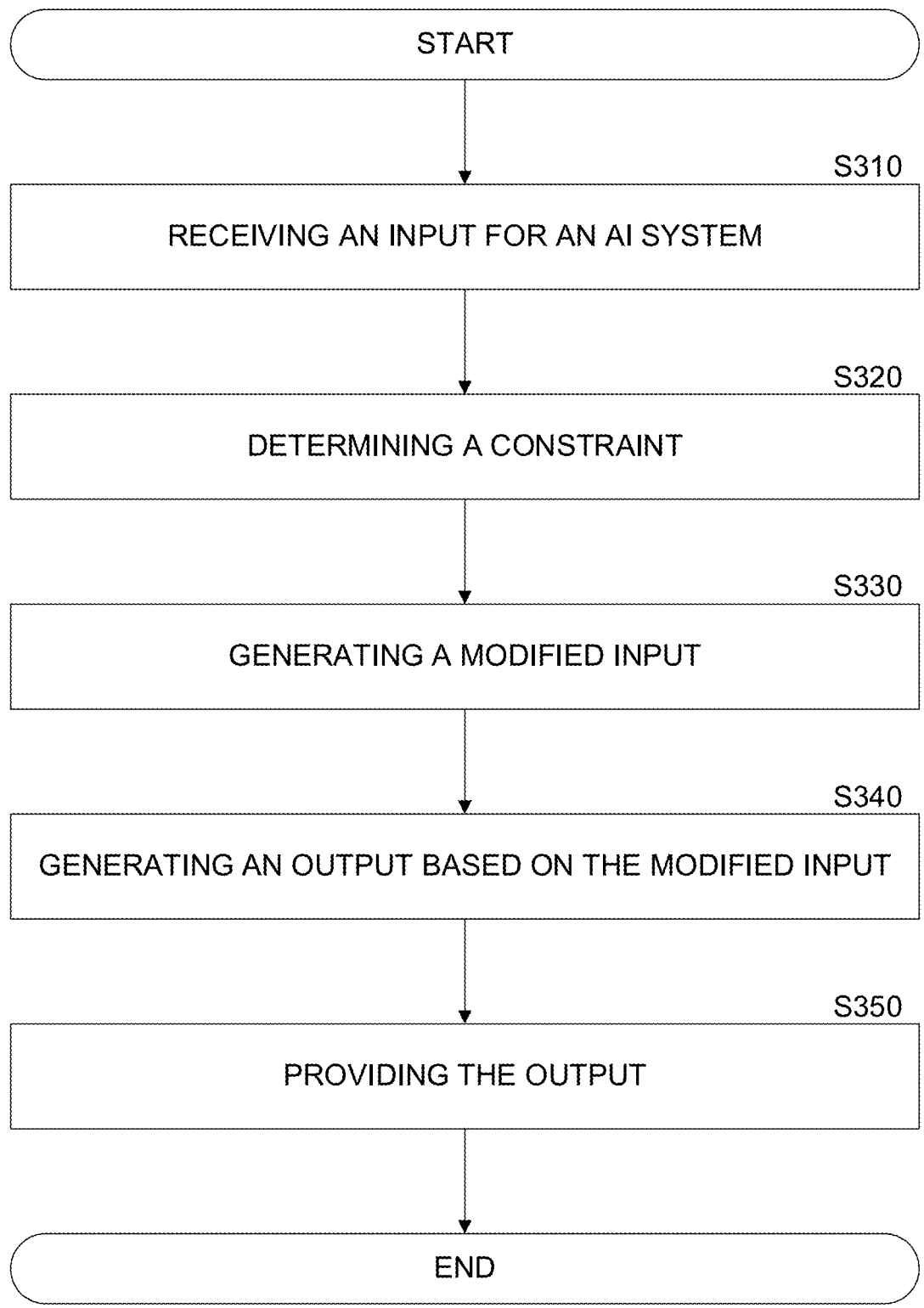
FIG. 3 is an example flowchart of a method for controlling input into an artificial intelligence (AI) model system, implemented according to an embodiment.

FIG. 3 is an example flowchart of a method for controlling input into an artificial intelligence (AI) model system, implemented according to an embodiment. In an embodiment, it is advantageous to provide a control for inputs into an AI model system, so as to improve utilization of the system. For example, this can be done to reduce processing (e.g., improve tokenization), to decrease cost (e.g., prompts with character number limitations on an output), etc.

At S310, an input is received. In an embodiment, the input is an input for an AI system. In some embodiments, the input is an input for an AI model. In certain embodiments, the input is a natural language input. For example, the input is a question in a human-readable language, such as English. In an embodiment, the input includes a plurality of characters arranged as words, a plurality of words arranged as a sentence, a plurality of sentences arranged as a paragraph, various combinations thereof, and the like.

In some embodiments, the input includes a prompt for a language model, such as a large language model, a small language model, and the like. In an embodiment, the prompt is received from a client, e.g., a client software application, a client device, and the like.

At S320, a constraint is determined. In some embodiments, a plurality of constraints are generated, and determining the constraint includes selecting at least constraint of a plurality of preexisting constraints.

According to an embodiment, a constraint includes a condition, a requirement, a prerequisite, a blacklist of terms, a whitelist of terms, a combination thereof, and the like, which is applied on the input. In an embodiment, a constraint includes utilizing retrieval augmented generation (RAG) to improve output generation. In certain embodiments, the constraint includes a prompt portion (e.g., "limit answer to 500 characters. In an embodiment, the constraint includes a preprocessing of the input, such as removing articles (e.g., "the", "a", "an"), removing certain words, phrases, etc., (e.g., "please", "I", "you", etc.), replacing certain words (e.g., replace "create" with "generate"), a combination thereof, and the like.

In an embodiment, a constraint is generated based on a plurality of I/O pairs, for example which have a certain verification score, having a verification score within a predefined range, etc. In an embodiment, the constraint is generated by prompting a language model with a plurality of inputs, a plurality of outputs, a plurality of I/O pairs, and the like, to output a detected pattern of, for example, inputs having outputs with a verification score of 0.9 and above. In an embodiment, the constraint is generated based on the detected pattern.

For example, in certain embodiments, an input is received and a semantic score is generated between the received input and a plurality of input clusters. In an embodiment, where the semantic score does not satisfy a threshold, the input is rejected. In some embodiments, metadata based on the semantic score, a notification, an alert, and the like, are generated and sent to the client, included in the rejection.

At S330, a modified input is generated. In an embodiment, the modified input is generated based on the received input and at least a constraint. In some embodiments, a modified input is not generated in response to determining that the received input should be rejected.

In certain embodiments, the modified input is generated by a generative AI model, such as an LLM, an SLM, a GAN, and the like. In an embodiment, the modified input is generated based on a plurality of constraints. In certain embodiments, the modified input is generated further based on an identifier of an AI model which is an AI model of a plurality of AI models deployed on an AI model system.

In an embodiment, a plurality of modified inputs are generated. For example, in an embodiment, each modified input is generated based on the received input and a unique constraint of a plurality of constraints. In some embodiments, a constraint is selected based on the received input, based on the AI model, based on an indicated preference, a combination thereof, and the like.

At S340, an output is generated. In an embodiment, generating an output includes providing the modified input to an AI model of a plurality of AI models. In some embodiments, the modified input is provided to each AI model. In certain embodiments, a plurality of modified inputs are provided each to a corresponding AI model of a plurality of AI models, such that a plurality of outputs are generated, each from a corresponding AI model.

In some embodiments, the output is generated based on an AI model, a plurality of AI models, etc. For example, according to an embodiment, a first AI model is provided with the modified input to generate a first output. In an embodiment, the first output is utilized as an input for a second AI model, a plurality of second AI models, and the like. In certain embodiments, the input is processed sequentially by a plurality of AI models, such that a first input is utilized by a first AI model to generate an output which is utilized by a second AI model, which in turn generates an output utilized by a third AI model, etc., until an output is eventually provided as an output from the verification system.

At S350, the output is provided. In an embodiment, the output is provided in to a client device, a client software, and the like. In some embodiments, a verification score is generated based on an output. In an embodiment, the verification score is generated based on the input, the modified input, an output, a combination thereof, and the like.

According to an embodiment, a vector is generated for the input, the modified input, the output, etc., and a distance is determined between each pair of vectors. In some embodiments, vector distances are utilized in determining a verification score, such as described in more detail herein.

In an embodiment, the output is provided in response to determining that the verification score satisfies a condition, exceeds a threshold, is below a threshold, a combination thereof, and the like.

In some embodiments, the output is not provided. For example, in certain embodiments, the verification system is configured to apply a constraint, a policy, a condition, and the like, on the output. For example, in an embodiment, a semantic distance is determined between the output and at least another output which was previously generated. In an embodiment, in response to determining that the semantic distance is greater than a predetermined threshold, the generated output is not provided.

In certain embodiments, where an output is not provided, a notification, a metadata, an alert, a combination thereof, and the like, are provided in lieu of the output. For example, in an embodiment, a notification is provided, e.g., to a client software, indicating that the output is not an output which is allowed. In some embodiments, a constraint, an explanation based on the constraint, etc., are provided for example as part of the notification.

Figure 4:
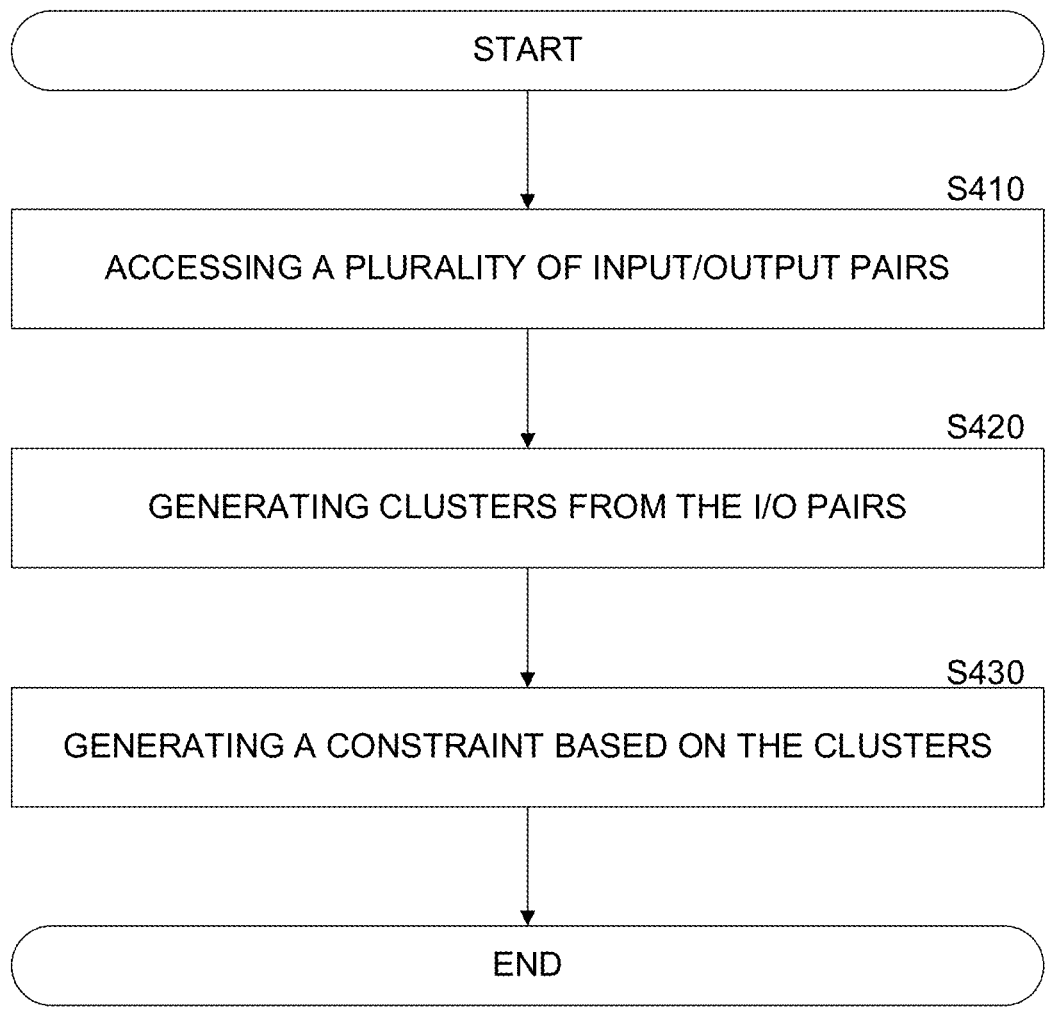
FIG. 4 is an example flowchart of a method for generating a constraint for a verification system of an AI model, implemented in accordance with an embodiment.

FIG. 4 is an example flowchart of a method for generating a constraint for a verification system of an AI model, implemented in accordance with an embodiment. In an embodiment, a verification system is configured to apply a constraint on an input, on a modified input, on an output, a combination thereof, and the like. In some embodiments, certain constraints are received, for example by user input, and certain constraints are generated.

At S410, a plurality of I/O pairs are accessed. In an embodiment, each I/O pair includes an input and an output generated based on the input. In an embodiment, the output is generated indirectly based on the input, for example by generating a modified input based on the input, processing the modified input utilizing an AI model, wherein the AI model is configured to generate the output. In some embodiments, the output is further modified by the verification system, which is configured to generate a modified output. In an embodiment, an I/O pair includes an input, a modified input, an output, a modified output, representations thereof, any combination thereof, and the like.

In some embodiments, the plurality of I/O pairs are accessible on a cloud storage, such as a bucket, an S3 storage, and the like. In an embodiment, a modified input, a modified output, and the like, are generated by a verification system, a controller of a verification system, and the like.

In an embodiment, an I/O pair includes attributes of an input, attributes of an output, and the like. According to some embodiments, the attributes are features, values, and the like, for example of a feature space into which the input, the output, etc., are mapped.

At S420, a plurality of clusters are generated. In some embodiments, the clusters are generated based on an attribute of an input, an attribute of an output, a pattern of inputs, a pattern of outputs, a value of an input, a value of an output, a combination thereof, and the like.

In an embodiment, the clusters are generated based on a selected attribute value, for example. In some embodiments, inputs are clustered based on a value of outputs, outputs are clustered based on values of inputs, etc.

At S430, a constraint is generated. In an embodiment, a constraint includes a rule, a condition, a policy, and the like, which is generated based on a cluster, a plurality of clusters, etc.

For example, in an embodiment, a constraint includes a prompt portion for a language model, indicating that an output should be "500 characters or less". In some embodiments, the constraint includes removing contextually insignificant words from an input. In certain embodiments, a constraint includes configuring an AI model to apply a tone (e.g., formal, informal, professional, clinical, etc.) to a textual output.

In some embodiments, a verification system is configured to apply a constraint on an input, apply a constraint on an output, a combination thereof, and the like. In some embodiments, a first plurality of constraints is applied on an input, and a second plurality of constraints is applied on an output.

Figure 5:
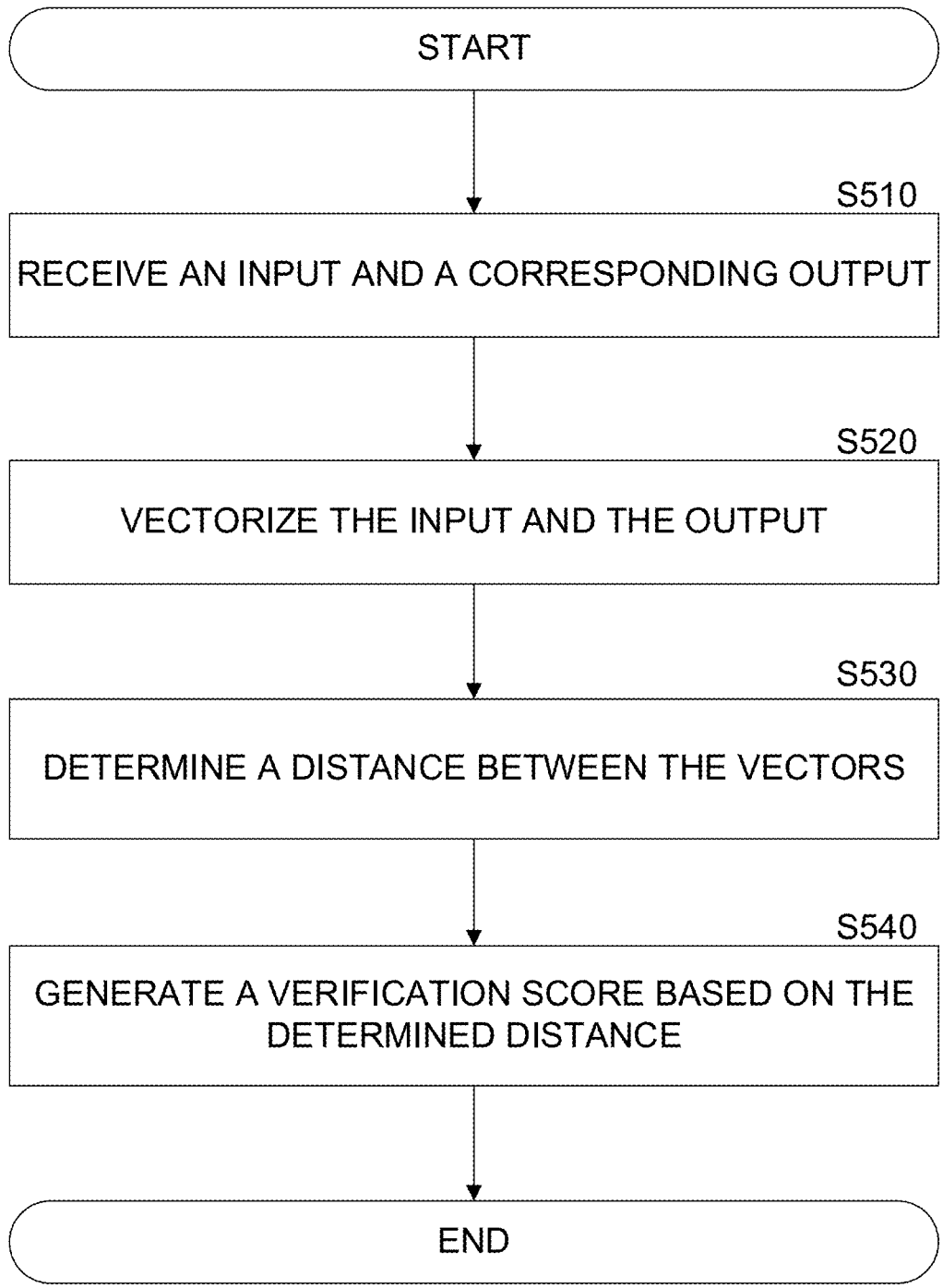
FIG. 5 is an example flowchart of a method for vectorizing a textual resource, implemented in accordance with an embodiment.

FIG. 5 is an example flowchart of a method for vectorizing a textual resource, implemented in accordance with an embodiment.

At S510, an I/O pair is received. In some embodiments, receiving an I/O pair includes accessing an application programming interface (API), a data store, a database, etc., through which, or in which, a an I/O pair is stored.

In an embodiment, an I/O pair includes an input and a corresponding output. In some embodiments, the input is a natural language query, a structured query, an unstructured query, a combination thereof, and the like.

In certain embodiments, the output is a response generated based on the input. For example, in an embodiment, the output is generated by a generative AI configured to generate responses to queries based on a data source, a knowledge base, a combination thereof, and the like. In an embodiment, the response is generated based on structured data, on unstructured data, a combination thereof, and the like.

In an embodiment, the I/O pair includes a plurality of outputs. For example, in some embodiments, each output is generated by a language model based on a different prompt. In certain embodiments, each output is generated by different language models having different context lengths, based on the same input, modified input, etc.

At S520, vectorization is initiated. In an embodiment, an input, an output, etc., are each vectorized. In some embodiments, vectorization includes generating a vector in a vector database based on a feature space and the input, the output, etc.

In some embodiments, the input, output, etc., are preprocessed prior to initiating vectorization. For example, according to an embodiment, certain predetermined words are removed from the query, such as grammatical articles (i.e., "the", "a", "an", etc.). In an embodiment, this is advantageous as certain words contain less contextual information than others, and therefore there is little to no advantage in processing these words for generating a vector.

In an embodiment, vectorization is performed utilizing techniques such as word2vec, doc2vec, top2vec, a combination thereof, and the like. In some embodiments, a plurality of vectors are generated, for example, based on different techniques, for each of the input and the output. For example, in an embodiment, a first vector is generated based on the input utilizing word2vec, a second vector is generated based on the input utilizing doc2vec, etc.

At S530, a vector distance is determined. In an embodiment, the distance is based on a first vector (e.g., which is generated based on the input) and a second vector (e.g., which is generated based on the output).

In an embodiment, the vector distance is generated based on a cosine similarity between the first vector and the second vector. According to some embodiments, a cosine similarity is a measure of similarity between two vectors which is based on an inner product space. In other embodiments, various techniques are utilized in determining a similarity between the first vector and the second vector.

At S540, a verification score is generated. In an embodiment, the verification score is generated based on the determined distance. In some embodiments, the verification score is generated based on a similarity metric which is generated between the query and a first response, the query and a second response, a combination thereof, and the like.

In some embodiments, the verification score is generated such that the score is normalized between a range of numerical values, e.g., between 0 and 100, between 0 and 1, etc.

Figure 6:
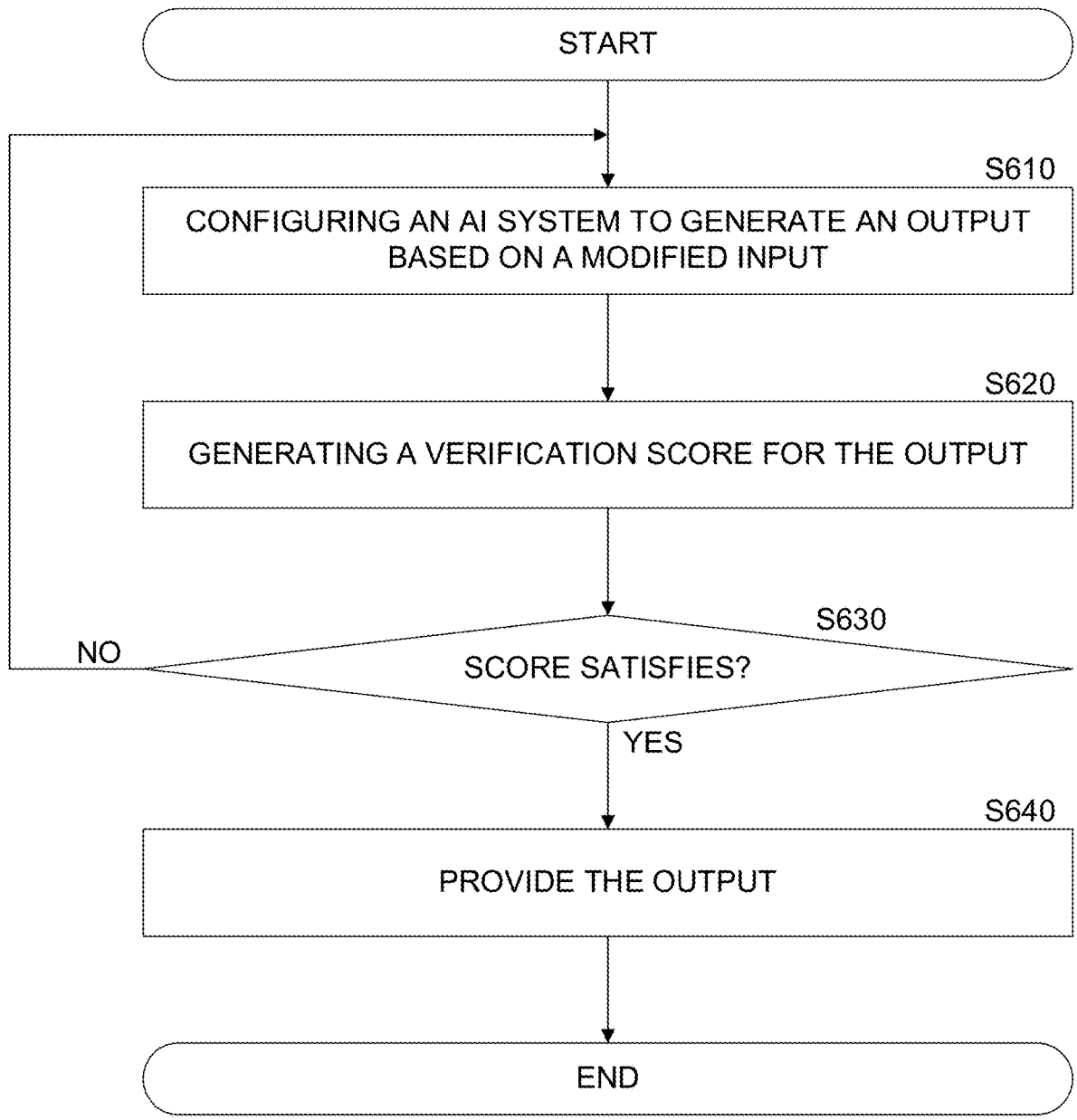
FIG. 6 is an example flowchart of a method for applying a control on an AI model system, implemented in accordance with an embodiment.

FIG. 6 is an example flowchart of a method for applying a control on an AI model system, implemented in accordance with an embodiment. In some embodiments, a control includes applying a constraint on an input, on an output, on a combination thereof, and the like, of an AI model of an AI model system. In certain embodiments, a first constraint is applied on a first AI model, and a second constraint is applied on a second AI model.

At S610, an AI model is configured to generate an output. In an embodiment, the AI model is a generative AI model, a GAN, a language model (e.g., a small language model, a large language model, etc.), and the like. In certain embodiments, the AI model is uni-modal, multi-modal, and the like.

In an embodiment, the AI model is configured to generate an output based on a modified input. According to an embodiment, the modified input is generated based on an input and at least a constraint. In certain embodiments, the constraint is generated based on a clustering of existing input/output pairs, a plurality of inputs, a plurality of outputs, a plurality of modified inputs, a plurality of modified outputs, and any combination thereof.

At S620, a verification score is generated. In an embodiment, the verification score is generated based on the output, a data source utilized to generate the output, the input, a modified input, a combination thereof, and the like. For example, the verification score is generated, according to an embodiment, utilizing the method described in more detail above.

In some embodiments, the verification score is generated based on a similarity metric which is generated between the input and a first output, the input and a second output, a combination thereof, and the like. In some embodiments, the similarity metric is generated by vectorizing the input and the output, and generating a cosine similarity between the vectorized input and the vectorized output.

In certain embodiments, the verification score is generated based on a semantic similarity between the output and another output of an I/O pair, wherein the input of the I/O pair is semantically similar to an input, a modified input, etc., which is utilized in generating the output. In other embodiments, other methods of generating a verification score are utilized, without departing from the scope of this disclosure.

At S630, a check is performed to determine if the verification score satisfies a condition. In an embodiment, a verification score satisfies a condition in response to determining that the vector score exceeds a threshold, is below a threshold, etc. In some embodiments, the verification score, a metric generated based thereon, and the like, are compared to determine if the condition is satisfied.

In an embodiment, where the condition is satisfied, execution continues at S640. In some embodiments, where the condition is not satisfied, execution continues at S610. In certain embodiment, where execution continues at S610, another output is generated. For example, in an embodiment, a modified input was processed by an AI model and produced an output which corresponds to a verification score which does not satisfy the condition. In such an embodiment, a verification system is configured to initiate generation of another output, for example based on a different modified input, a different constraint, a combination thereof, and the like.

At S640, an output is provided. In an embodiment, the output is generated based on an input, a first modified input, a second modified input, etc. In some embodiments, the output is a modified output, which is generated based on a result, an output, and the like, of an AI model, of a plurality of AI models, etc.

In some embodiments, the output is provided to a software client, to a client device, etc., in response to determining that a condition and the like is satisfied, for example, based on the generated verification score.

According to an embodiment, applying such a control system allows for sanitizing inputs into an AI model, and also allows for providing data loss prevention (DLP) capability, so that proprietary information for example, is not leaked through an AI model. In some embodiments applying a control system allows for cost reduction, improving response accuracy, reducing bias in output generation, reducing toxic outputs, and applying constrains for optimization based on an individual organization requirements. It is therefore advantageous for at least these reasons to apply controls on an input, an output, a combination thereof, and the like, of an AI model system, such as described in more detail herein.

Figure 7:
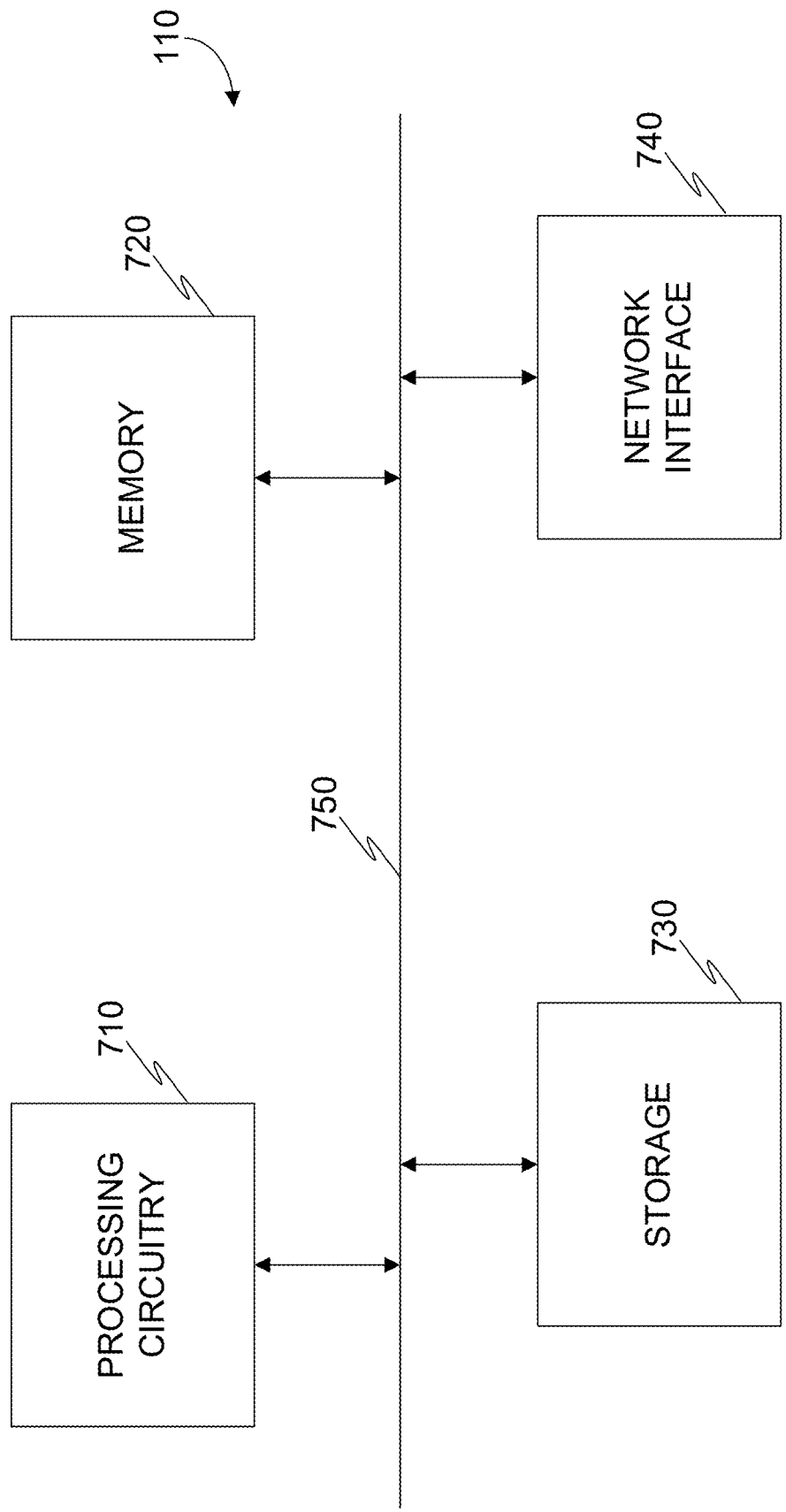
FIG. 7 is an example schematic diagram of a verification system according to an embodiment.

FIG. 7 is an example schematic diagram of a verification system 110 according to an embodiment. The verification system 110 includes, according to an embodiment, a processing circuitry 710 coupled to a memory 720, a storage 730, and a network interface 740. In an embodiment, the components of the verification system 110 are communicatively connected via a bus 750.

In certain embodiments, the processing circuitry 710 is realized as one or more hardware logic components and circuits. For example, according to an embodiment, illustrative types of hardware logic components include field programmable gate arrays (FPGAs), application-specific integrated circuits (ASICs), Application-specific standard products (ASSPs), system-on-a-chip systems (SOCs), graphics processing units (GPUs), tensor processing units (TPUs), Artificial Intelligence (AI) accelerators, general-purpose microprocessors, microcontrollers, digital signal processors (DSPs), and the like, or any other hardware logic components that are configured to perform calculations or other manipulations of information.

In an embodiment, the memory 720 is a volatile memory (e.g., random access memory, etc.), a non-volatile memory (e.g., read only memory, flash memory, etc.), a combination thereof, and the like. In some embodiments, the memory 720 is an on-chip memory, an off-chip memory, a combination thereof, and the like. In certain embodiments, the memory 720 is a scratch-pad memory for the processing circuitry 710.

In one configuration, software for implementing one or more embodiments disclosed herein is stored in the storage 730, in the memory 720, in a combination thereof, and the like. Software shall be construed broadly to mean any type of instructions, whether referred to as software, firmware, middleware, microcode, hardware description language, or otherwise. Instructions include, according to an embodiment, code (e.g., in source code format, binary code format, executable code format, or any other suitable format of code). The instructions, when executed by the processing circuitry 710, cause the processing circuitry 710 to perform the various processes described herein, in accordance with an embodiment.

In some embodiments, the storage 730 is a magnetic storage, an optical storage, a solid-state storage, a combination thereof, and the like, and is realized, according to an embodiment, as a flash memory, as a hard-disk drive, another memory technology, various combinations thereof, or any other medium which can be used to store the desired information.

The network interface 740 is configured to provide the verification system 110 with communication with, for example, the AI model system 130, the data source 150, the I/O store 140, a combination thereof, and the like, according to an embodiment.

It should be understood that the embodiments described herein are not limited to the specific architecture illustrated in FIG. 7, and other architectures may be equally used without departing from the scope of the disclosed embodiments.

Furthermore, in certain embodiments the AI model system 130 may be implemented with the architecture illustrated in FIG. 7. In other embodiments, other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer-readable medium consisting of parts, or of certain devices and/or a combination of devices. The application program may be uploaded to, and executed by, a machine comprising any suitable architecture. Preferably, the machine is implemented on a computer platform having hardware such as one or more processing units ("PUs"), a memory, and input/output interfaces. The computer platform may also include an operating system and microinstruction code. The various processes and functions described herein may be either part of the microinstruction code or part of the application program, or any combination thereof, which may be executed by a PU, whether or not such a computer or processor is explicitly shown. In addition, various other peripheral units may be connected to the computer platform such as an additional data storage unit and a printing unit. Furthermore, a non-transitory computer-readable medium is any computer-readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for applying controls on an input for an artificial intelligence model:
    receiving an input for a system having a generative artificial intelligence (AI) model, wherein the generative AI model is configured to generate an output based on at least a data source;
    determining at least a constraint for the input based on a predetermined constraint from a plurality of preexisting constraints, including a retrieval augmented generation (RAG);
    generating a modified input based on the determined constraint;
    processing the modified input utilizing the generative artificial AI model to generate an output;
    generating a first contextual value based on the modified input;
    generating a second contextual value based on the generated output;
    generating a score based on any one of: the first contextual value, the second contextual value, and a combination thereof; and
    sending the generated output to a client of the system.

2. The method of claim 1, further comprising:
    generating the predetermined constraint based on an analysis of a plurality of input-output pairs, each input-output pair including an output generated by the generative AI based on an input.

3. The method of claim 2, further comprising:
    clustering the plurality of input-output pairs into a plurality of input-output groups, wherein each input-output group is clustered based on the input.

4. The method of claim 2, further comprising:
    clustering the plurality of input-output pairs into a plurality of input-output groups, wherein each input-output group is clustered based on the output.

5. The method of claim 2, wherein the analysis of the plurality of input-output pairs further comprises:
    generating a verification score for each output of an input-output pair; and
    generating the predetermined constraint based on input-output pairs having a verification score which satisfies condition based on a predetermined threshold.

6. The method of claim 5, further comprising:
    detecting at least an attribute common to each input of the input-output pairs having the verification score which satisfies the condition; and
    generating the modified input further based on the detected attribute.

7. The method of claim 6, further comprising:
    detecting at least another attribute common to each input of the input-output pairs having a verification score which does not satisfy the condition; and
    generating the modified input further based on the detected at least another attribute.

8. The method of claim 1, further comprising:
    generating the predetermined constraint based on an analysis of a plurality of inputs.

9. The method of claim 1, further comprising:
    generating the predetermined constraint based on an analysis of a plurality of outputs.

10. The method of claim 1, further comprising:
    sending the generated output in response to determining that the verification score satisfies a condition based on a predetermined threshold.

11. The method of claim 10, further comprising:
    initiating generation of a second modified input, in response to determining that the verification score does not satisfy a condition;
    processing the second modified input to generate another output; and
    sending the another output in response to determining that a verification score based on the another output satisfies the condition.

12. The method of claim 11, further comprising:
    generating the second modified input based on a second determined constraint.

13. The method of claim 1, further comprising:
generating a metadata based on the verification score; and
sending the generated output and the generated metadata.

14. The method of claim 1, further comprising:
generating the verification score further based on data extracted from the at least a data source.

15. The method of claim 1, wherein sending the output further comprises:
modifying the output based on any one of: sanitizing the output, generating a semantically compressed output, modifying a tone of the output, and any combination thereof.

16. A non-transitory computer-readable medium storing a set of instructions for applying controls on an input for an artificial intelligence model, the set of instructions comprising:
one or more instructions that, when executed by one or more processing circuitries of a device, cause the device to:
receive an input for a system having a generative artificial intelligence (AI) model, wherein the generative AI model is configured to generate an output based on at least a data source;
determine at least a constraint for the input based on a predetermined constraint from a plurality of preexisting constraints, including a retrieval augmented generation (RAG);
generate a modified input based on the determined constraint;
process the modified input utilizing the generative artificial AI model to generate an output;
generate a first contextual value based on the modified input;
generate a second contextual value based on the generated output;
generate a score based on any one of: the first contextual value, the second contextual value, and a combination thereof; and
send the generated output to a client of the system.

17. A system for applying controls on an input for an artificial intelligence model: comprising:
one or more processing circuitry circuitries configured to:
receive an input for a system having a generative artificial intelligence (AI) model, wherein the generative AI model is configured to generate an output based on at least a data source;
determine at least a constraint for the input based on a predetermined constraint from a plurality of preexisting constraints, including a retrieval augmented generation (RAG);
generate a modified input based on the determined constraint;
process the modified input utilizing the generative artificial AI model to generate an output;
generate a first contextual value based on the modified input;
generate a second contextual value based on the generated output;
generate a score based on any one of: the first contextual value, the second contextual value, and a combination thereof; and
send the generated output to a client of the system.

18. The system of claim 17, wherein the one or more processing circuitries circuitry are further configured to:
generate the predetermined constraint based on an analysis of a plurality of input-output pairs, each input-output pair including an output generated by the generative AI based on an input.

19. The system of claim 18, wherein the one or more processing circuitries circuitry are further configured to:
cluster the plurality of input-output pairs into a plurality of input-output groups, wherein each input-output group is clustered based on the input.

20. The system of claim 18, wherein the one or more processing circuitries circuitry are further configured to:
cluster the plurality of input-output pairs into a plurality of input-output groups, wherein each input-output group is clustered based on the output.

21. The system of claim 18, wherein the analysis of the plurality of input-output pairs further comprises:
generating a verification score for each output of an input-output pair; and
generating the predetermined constraint based on input-output pairs having a verification score which satisfies condition based on a predetermined threshold.

22. The system of claim 21, wherein the one or more processing circuitries circuitry are further configured to:
detect at least an attribute common to each input of the input-output pairs having the verification score which satisfies the condition; and
generate the modified input further based on the detected attribute.

23. The system of claim 22, wherein the one or more processing circuitries circuitry are further configured to:
detect at least another attribute common to each input of the input-output pairs having a verification score which does not satisfy the condition; and
generate the modified input further based on the detected at least another attribute.

24. The system of claim 17, wherein the one or more processing circuitries circuitry are further configured to:
generate the predetermined constraint based on an analysis of a plurality of outputs.

25. The system of claim 17, wherein the one or more processing circuitries circuitry are further configured to:
send the generated output in response to determining that the verification score satisfies a condition based on a predetermined threshold.

26. The system of claim 25, wherein the one or more processing circuitries circuitry are further configured to:
initiate generation of a second modified input, in response to determining that the verification score does not satisfy a condition;
process the second modified input to generate another output; and
send the another output in response to determining that a verification score based on the another output satisfies the condition.

27. The system of claim 26, wherein the one or more processing circuitries circuitry are further configured to:
generate the second modified input based on a second determined constraint.

28. The system of claim 17, wherein the one or more processing circuitries circuitry are further configured to:
generate the verification score further based on data extracted from the at least a data source.

* * * * *